United States Patent [19]

Katohno et al.

[11] Patent Number: 5,180,117
[45] Date of Patent: Jan. 19, 1993

[54] VIDEO TAPE RECORDER AND/OR REPRODUCER

[75] Inventors: Nobuo Katohno, Mito; Yoshihiro Shibata, Katsuta, both of Japan

[73] Assignee: Hitachi, Ltd., Tokyo, Japan

[21] Appl. No.: 537,640

[22] Filed: Jun. 14, 1990

[30] Foreign Application Priority Data

Jun. 14, 1989 [JP] Japan ................................. 1-149646

[51] Int. Cl.$^5$ ............................................. G11B 15/18
[52] U.S. Cl. ..................................... 242/189; 360/95
[58] Field of Search ............... 242/200, 201, 202, 204; 360/85, 95, 96.3, 96.4

[56] References Cited

U.S. PATENT DOCUMENTS

| | | | |
|---|---|---|---|
| 4,074,873 | 2/1978 | Hayashi et al. | 242/204 X |
| 4,092,684 | 5/1978 | Umeda | 360/85 |
| 4,562,496 | 12/1985 | Saito et al. | 360/95 X |
| 4,591,935 | 5/1986 | Kouda | 242/201 X |
| 4,614,315 | 9/1986 | Gerrits et al. | 242/200 |
| 4,681,281 | 7/1987 | Aarts et al. | 242/200 |
| 4,708,302 | 11/1987 | Yamaguchi et al. | 242/204 |
| 4,796,116 | 1/1989 | Kwon et al. | 360/95 X |
| 4,807,064 | 2/1989 | Miyamoto et al. | 360/85 |
| 4,949,203 | 8/1990 | Kunimaru et al. | 360/85 |
| 4,961,120 | 10/1990 | Mototake et al. | 360/96.3 X |
| 5,005,091 | 4/1991 | Tsujimoto | 360/85 X |

FOREIGN PATENT DOCUMENTS

| | | | |
|---|---|---|---|
| 2935513 | 3/1980 | Fed. Rep. of Germany | 242/201 |
| 57-38075 | 3/1982 | Japan . | |
| 60-17073 | 5/1985 | Japan . | |
| 2078431 | 1/1982 | United Kingdom | 360/85 |

Primary Examiner—Daniel P. Stodola
Assistant Examiner—John P. Darling
Attorney, Agent, or Firm—Antonelli, Terry Stout & Kraus

[57] ABSTRACT

In a video tape recorder and/or reproducer, the power of a capstan motor for driving a magnetic tape is utilized as the power for driving reels in a cassette. In order to facilitate controlling the tension of the magnetic tape at the time of a change in the travelling direction of the tape in an intermittent tape travel mode, it is possible to drive a feed-side reel without turning OFF a back tension servo mechanism which applies back tension to the feed-side reel. In this state, the change in the travelling direction of the magnetic tape is performed by only controlling the direction of rotation of the capstan motor.

3 Claims, 5 Drawing Sheets

FUNCTION MODE SWITCH CODE

| POSITION NO. | 1 | 2 | 3 | 4 | 5 | 6 | 7 | 8 |
|---|---|---|---|---|---|---|---|---|
| MODE OF MECHANISM / TERMINAL OF SWITCH | FRONT LOAD MECHANISM DRIVE POSITION | TAPE UNLOADING POSITION | TAPE LOADING POSITION | FIRST FORWARD & FIRST REWIND POSITION | CUE SEARCH & RECORD/ PLAYBACK POSITION | FINE SLOW POSITION | REVERSE FINE SLOW POSITION | REVIEW SEARCH POSITION |
| NO. 1 | 0 | 0 | 0 | 0 | 1 | 1 | 1 | 0 |
| NO. 2 | 0 | 0 | 1 | 1 | 0 | 0 | 1 | 1 |
| NO. 3 | 0 | 1 | 0 | 1 | 0 | 1 | 0 | 1 |

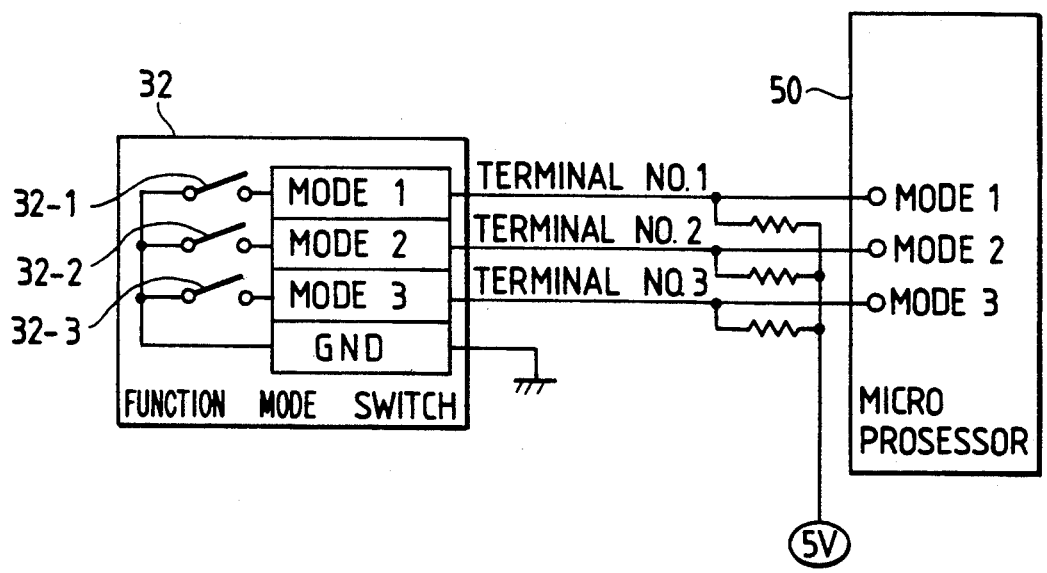

VIDEO TAPE RECORDER AND/OR REPRODUCER

BACKGROUND OF THE INVENTION

The present invention relates to changing forward and reverse tape travelling directions in a video tape recorder (VTR) for domestic use.

According to a conventional construction of a VTR, as described in Japanese Utility Model Publication No. 60-17073, a back tension servo mechanism is turned OFF when a magnetic tape is to travel in a direction opposite to a normal or forward travelling direction of the tape. Such conventional VTR for domestic use merely intended to reproduce a recorded picture at the same magnetic tape travelling speed as that used in the recording of the picture.

However, according to the recent technical trend on VTR's for domestic use, it is required to project a special recorded picture on a television set in a noiseless state, and it is also required to perform a highly accurate retrieval of a recorded picture position as quickly as possible at the time of copying recorded contents of a magnetic tape after recording onto another magnetic tape, namely, at the time of performing a so-called dubbing.

It is becoming difficult for the prior art to satisfy such requirements. More particularly, the separating of a tension pole of the back tension servo mechanism from a magnetic tape at the time of reverse travel of the tape, gives rise to the necessity of again operating the back tension servo mechanism at the next time of reverse travel. Therefore, it is difficult to appropriately control the tension of the magnetic tape in forward tape travel and in reverse travel.

In a special reproduction, for example in a generally called slow-motion reproduction, by allowing a magnetic tape to travel intermittently, it is made possible to trace a predetermined recording track using a magnetic head, to obtain a clear picture. However, at the time of change between the forward and reverse travel of the tape in such intermittent tape travelling, it is difficult to control the tension of the magnetic tape.

In the prior art described above, no consideration is given to an appropriate control for the tension of a magnetic tape at the time of change between the forward and reverse tape travel directions. Particularly, when there is a change from one to the other tape travelling direction in the intermittent tape travelling, the magnetic tape is instantaneously loosened, thus causing a poor contact between the magnetic head and the magnetic tape, that is, creating a space loss, with the result that the reproduced picture contains noise and is unsightly.

Moreover, the time period required for the direction change is long and a considerable time period is required for dubbing and editing the magnetic tape.

According to a method proposed for remedying such drawbacks of the prior art, a motor only for driving a reel is used to enhance the control of the tape travel. However, the product obtained is fairly expensive so is not applicable to a domestic VTR.

SUMMARY OF THE INVENTION

It is the object of the present invention to provide a video tape recorder and/or reproducer capable of easily controlling the tension of a magnetic tape at the time of direction change in intermittent tape travelling and also capable of making the direction change quickly, at low cost.

In order to achieve the above-mentioned object and first in order to realize the reduction of cost, the power of a capstan motor which drives a magnetic tape is utilized for driving reels. Next, to facilitate controlling the tension of the magnetic tape at the time of direction change-over in intermittent tape travelling, the feed-side reel is driven without turning OFF the back tension servo mechanism which applies a back tension torque to the reel, and in this state the change of the magnetic tape travelling direction is performed by only making a change control for the rotating direction of the capstan motor, whereby the travelling direction change can be done quickly while applying an appropriate tension to the magnetic tape.

More specifically, in intermittent travelling of the magnetic tape, the tape is sandwiched between a capstan shaft driven by the capstan motor and a pinch roller. During the intermittent travel of the tape, the capstan motor is also intermittently rotated to let the tape travel intermittently. The magnetic tape delivered by the capstan shaft and the pinch roller is wound up by a reeling mechanism driven by the capstan motor. Also at the time of intermittent travel of the tape, since the reeling mechanism utilizes the power fed from the capstan motor, the winding of the tape is performed in synchronism with the movement of the tape delivered from the capstan, so there is no problem in a normal intermittent feed of the tape.

At the time of change-over of the tape travelling direction and first at the time of change-over from the forward travel to the reverse travel, one end side of a tension band of the back tension servo mechanism in the forward travel which applies a back tension torque to the feed reel is mounted to a feed reel base which holds and drives the feed reel side, so as to be movable over a predetermined range while having a predetermined pulling force, whereby it becomes possible to drive the feed-side reel at a normally-set reel winding torque without turning OFF the tension servo mechanism. Also, as to instantaneous loosening of the magnetic tape which occurs at the time of change-over from the forward to the reverse travel of the tape, it becomes possible for a tension pole of the tension servo mechanism to follow it, so that the change-over is effected with little loosening of the magnetic tape. Also at the time of subsequent change-over from the reverse to the forward travel of the tape and from the forward to the reverse, all that is required is a mere change-over control for the rotating direction of the capstan motor, thus permitting quick change-over.

BRIEF DESCRIPTION OF THE DRAWINGS

FIG. 6 is a circuit diagram of the mecha state switch portion; and

FIG. 7 is a diagram showing a correlation between ON, OFF of the switch and the codes.

DETAILED DESCRIPTION OF AN EMBODIMENT

An embodiment of the present invention will be described below with reference to the accompanying drawings.

Figure 2:
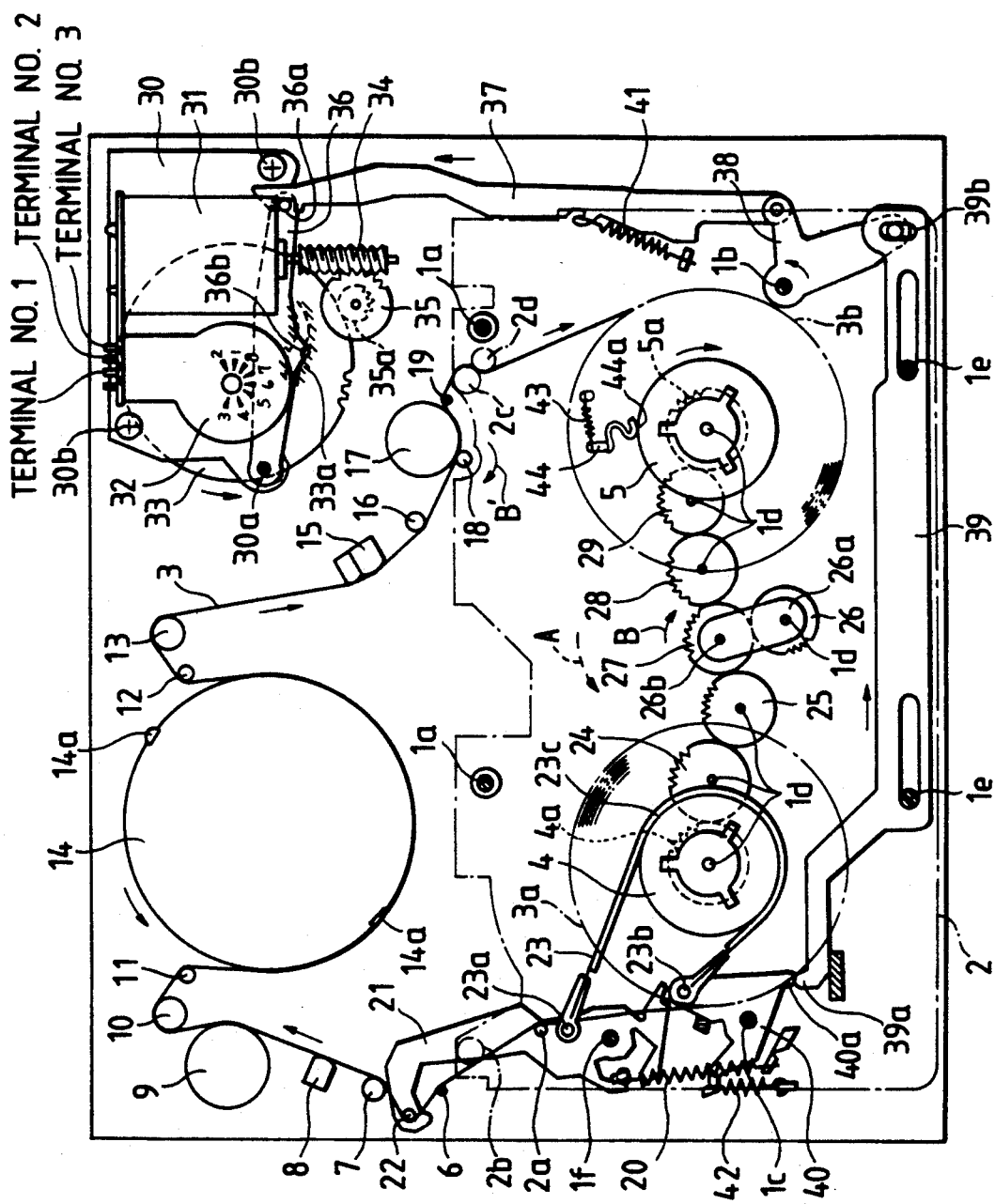
FIG. 2 is a plan view of the entire mechanism (forward intermittent travel mode)

According to the VTR for domestic use according to the present invention, as illustrated in FIG. 2, a magnetic tape 3, stored in a wound-up state in the cassette 2, is drawn out from the cassette and is wound a predetermined amount around a rotating cylinder 14, then a predetermined pictorial image is recorded on and/or reproduced from the magnetic tape 3 by a recording and/or reproducing head 14a incorporated in the cylinder 14 in a known manner. In more particular terms, the magnetic tape 3 is delivered from a feed reel 3a in the cassette 2 and passes guides 2a, 2b in the cassette, then passes guides 6, 7, full-track erase head 8, inertia roller 9, guide roller 10, guide 11, cylinder 14, guide 12, guide roller 13, sound control head 15 and guide 16, then is driven by a capstan shaft 18 and a pinch roller 17, further passes a guide 19, a guide 2c in the cassette 2 and a guide 2d, then is wound on a take-up reel 3b.

At this time, an appropriate tension is imposed on the magnetic tape 3 to ensure accurate video tape recording and/or reproducing. More specifically, as shown in FIG. 2, a tension pole 22, provided on a tension arm 21 pivotable about a shaft 1f on a chassis base 1, is interposed between the guides 6 and 7. One end 23a of a tension band 23 is pivotably fixed to the tension arm 21. An opposite end 23b of the tension band 23 is pivotably fixed to a front end portion of a band arm 40 which is pivotable about a shaft 1c on the chassis base 1. A spring 42 continuously imparts a counterclockwise rotating force to the band arm 40. A central portion 23c of the tension band 23 is wound on a feed reel base 4 which carries the feed reel 3a. A spring 20 continuously imparts a counterclockwise rotating force on the tension arm 21, with the spring 20 being stretched between the tension arm 21 and the chassis base 1, so that a predetermined tension is imposed on the magnetic tape 3.

The following description is now provided about a construction for winding onto the take-up reel 3b the magnetic tape 3 which has been driven and delivered by the capstan shaft 18 and the pinch roller 17.

Figure 3:
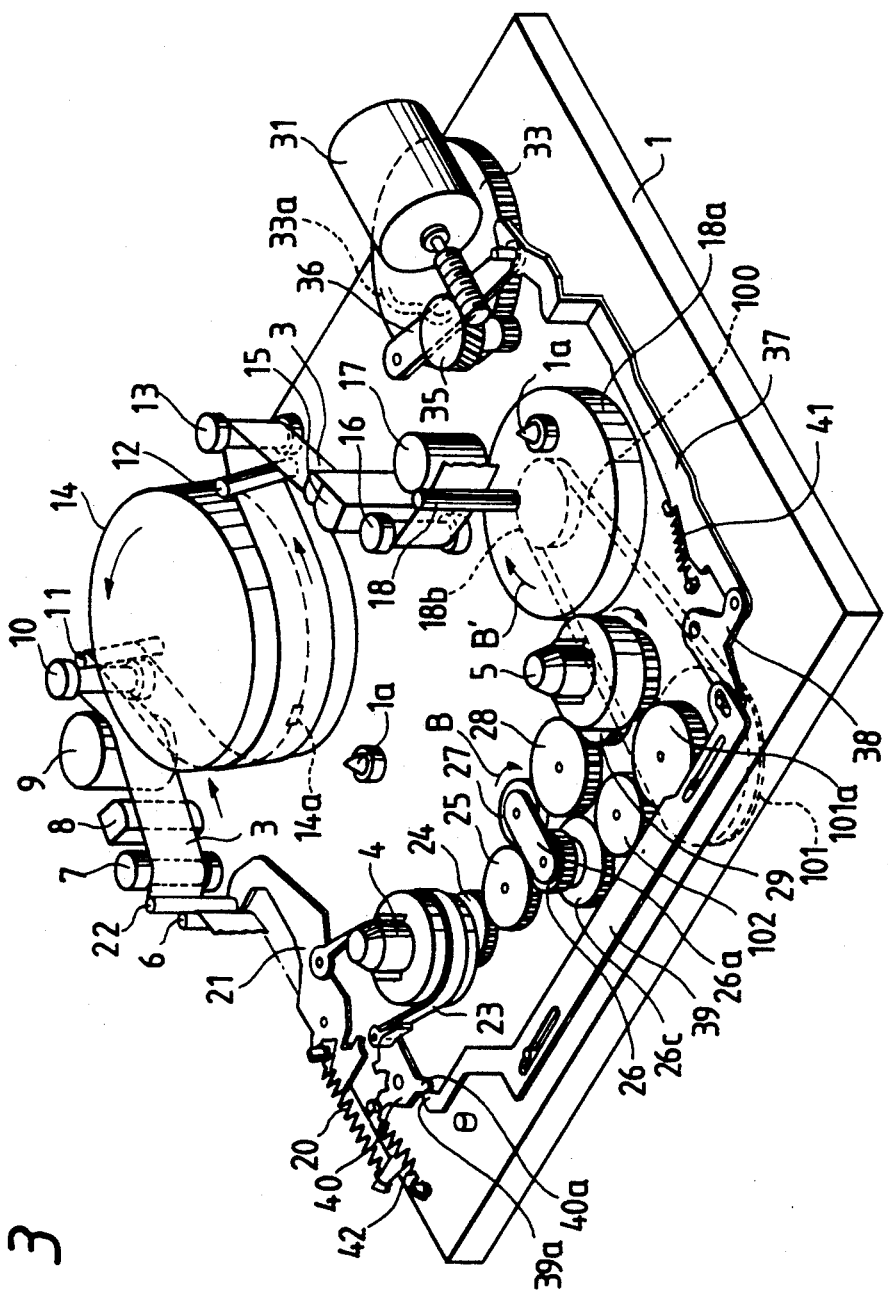
FIG. 3 is a perspective view of the entire mechanism.

In FIG. 3, the capstan shaft 18 is rotated directly by the capstan motor 18a. The capstan motor 18a is mounted below the capstan shaft 18, and a belt 100 is stretched between and around a pulley 18b which rotates integrally with the capstan shaft 18 and a belt pulley 101 which is rotatably supported through a shaft on the underside of the chassis base 1. The belt pulley 101 has a gear portion 101a formed at the upper portion thereof, with the gear portion 101a being in mesh with an intermediate gear 102 rotatably supported through a shaft on the underside of the chassis base 1. Further, feed reel base 4, take-up reel base 5, intermediate gears 24, 25, 28, 29, and center gear 26, are rotatably supported through shafts 1d provided on the chassis base 1, as shown in FIG. 2. Disposed below and coaxially with the center gear 26 is a friction gear 26c having a predetermined frictional torque, as shown in FIG. 3. The friction gear 26c is adapted to rotate in mesh with the intermediate gear 102. One end of the gear arm 26a is mounted on the rotational center shaft 1d of the center gear 26, with the gear arm 26a being pivotable about the shaft 1d. An arm shaft 26b is provided on an opposite end portion of the gear arm 26a with an oscillating gear 27 having a predetermined frictional torque being rotatably mounted onto arm shaft 26b.

When the cassette 2 is mounted on a positioning pin 1a provided on the chassis base 1, the feed reel 3a and the take-up reel 3b in the cassette 2 are placed and connected onto the feed and take-up reel bases 4, 5, respectively. When the rotation of the capstan motor 18a is in a clockwise direction, the oscillating gear 27 moves in the direction of arrow B (FIGS. 2 and 3), so that a gear portion 5a, provided integrally in the lower portion of the take-up reel base 5, can be driven through the intermediate gears 28 and 29, whereby the magnetic tape 3 driven and delivered by the capstan shaft 18 and the pinch roller 17, can be wound up.

When the capstan motor 18a rotates in a counterclockwise direction, the oscillating gear 27 moves in the direction (arrow A in FIG. 1) opposite to the direction of arrow B, whereby a gear 4a, provided integrally in the lower portion of the feed reel base 4, can be driven through the intermediate gears 25 and 24.

The construction of the driving mechanism for the magnetic tape 3 has been described above. Now, the following description is provided about the construction of an operating mechanism for the foregoing tension band portion and that of a function mode.

Figures 4, 5:
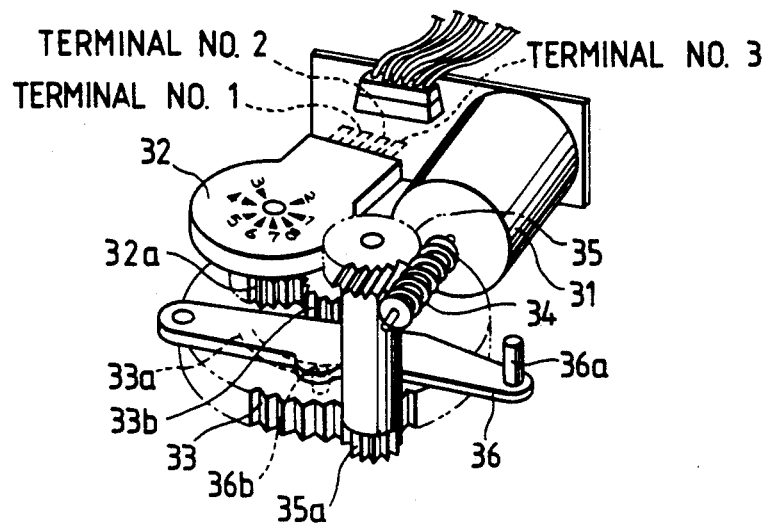
FIG. 4 is a perspective view of a function mode switch portion.
FIG. 5 is a diagram showing mecha state switch codes.

The function mode used in this embodiment has eight positions as shown in FIG. 5. More specifically, the first is a front load drive mode which permits loading and unloading of the cassette 2 with respect to the apparatus, with the details of this mode being omitted because this mode has no direct bearing on the present invention. The second mode is a mode in which the cassette 2 is placed on the chassis base 1 and the magnetic tape 3 is stored in the cassette 2. The third mode is a mode in which the magnetic tape 3 has been drawn out and wound around the cylinder 14 and is in a state of standstill. The fourth mode is a so-called fast forward, rewind mode involving high-speed winding of the magnetic tape. The fifth mode is a mode in which the magnetic tape is allowed to travel at a constant speed for performing a recording and reproducing as well as a so-called forward search for glancing at a picture to be reproduced. The sixth mode is a mode in which slow-motion reproduction, i.e., intermittent tape travelling, is performed in the forward direction. The seventh mode is a so-called reverse slow-motion reproduction mode in which intermittent travel of the tape is performed in the reverse direction, and the eighth mode is a so-called reverse search mode for glancing at a reproduction picture in a state of reverse travel of the tape.

The function mode thus constructed is controlled in the following manner. As shown in FIG. 4, by means of a worm 34 coupled directly to a rotary shaft of a mode motor 31, a gear portion 35a formed integrally with a worm wheel 35 which is in mesh with the worm 34 is rotated, so that a cam gear 33 meshing with the gear portion 35a rotates. As a result, a pinion gear 33b formed on the cam gear 33 rotates, thus causing rotation of a gear portion 32a of a rotary switch 32. With this rotation of the gear portion 32a, switches 32-1, 32-2 and 32-3 (FIG. 6) which are incorporated in the switch 32 turn ON or OFF. Therefore, it is possible to change the mode of the switch 32.

In this connection, as shown in FIG. 7, OFF and ON states of the switches 32-1, 32-2 and 32-3 are assumed to be "1" and "0", respectively, and this "1" or "0" code is outputted to terminal Nos. 1, 2 and 3 of the switch 32. The codes of these terminal Nos. 1, to 3 are set as shown in FIG. 5 and inputted to a microprocessor 50, as illustrated in FIG. 6, which, in turn, judges the mode, using a composite code which is set by the combination of the codes of the terminal Nos. 1, 2 and 3 in FIG. 5. When the function mode changes from the intermittent feed, forward travel of position 6 to the intermittent feed, reverse travel of position 7 and when the tape travelling distance after such change-over of the tape feed direction is within a predetermined range, for example, corresponding to ten frames of a video signal, the intermittent feed, forward travel of position 6 is still continued even if the switch is in position 7, and only after the tape travelling distance exceeds the above predetermined range, the intermittent feed, reverse travel of position 7 is executed.

The construction of the operating mechanism for the tension band portion shown in FIGS. 1 and 2 will now be described. The mode motor 31 and the switch 32 both already referred to in connection with FIG. 4 are held by a motor holder 30 and mounted to the chassis base 1 with bolts 30b. An operating arm 36 is pivotably mounted at one end thereof on a shaft portion 30a of the motor holder 30. The operating arm 36 has a pin 36a at an opposite end thereof and is further provided at an intermediate part thereof with a downwardly erected cam pin 36b. The cam pin 36b is inserted in a cam groove 33a of the cam gear 33, whereby the pivotal motion of the operating arm 36 can be controlled with rotation of the cam gear 33.

A slider 39 is slidably held while being guided by shafts 1e provided on the chassis base 1. The slider 39 has an engaging portion 39a on its left end side so that its rightward sliding motion causes the engaging portion 39a to engage with an engaging portion 40a of the band arm 40 thereby preventing the pivotal motion of the band arm 40 (FIG. 2), while its leftward sliding motion permits the band arm 40 to pivot in a predetermined range. Further, an elongated hole 39b is formed on the right end side of the slider 39 and it is engaged with a change arm 38.

The change arm 38 pivotally supported by a shaft 1b on the chassis base 1, and an arm portion thereof, on the side opposite to the side where the arm 38 engages the elongated hole 39b, is pivotally connected to one end side of a connecting arm 37 which is urged to this side by a spring 41. The connecting arm 37 has a hook-shaped portion formed on an opposite end side thereof, with the hook-shaped portion being engaged with the pin 36a of the operating arm 36. Thus, the slider 39 can be moved right and left by displacement of the cam groove 33a induced by the rotation of the cam gear 33. A predetermined braking torque is applied to the take-up reel base 5 by a spring 43 through a brake arm 44 and a brake shoe 44a.

In the apparatus constructed above, the present invention is concerned with changing over the forward and reverse tape travelling directions from one to the other in intermittent tape travel, and can exhibit the following functions.

Usually, when a recorded tape is to be reproduced, the apparatus is in the state shown in FIG. 2. That is, the capstan shaft 18 rotates in the direction of B' and the magnetic tape 3 travels in the arrowed direction in FIG. 2. At this time, the band arm 40 is fixed in a predetermined position for stable control of the tension of the magnetic tape 3. In other words, the slider 39 is in its rightmost position and fixed by the engaging portion 39a.

The following description is now provided about the operation in intermittent tape travel (so-called slow-motion reproduction or reproduction frame by frame).

At the time of shift from the normal reproducing state to the intermittent, forward tape travel, the band arm 40 may be in its state shown in FIG. 2. But, in the case of intermittent reverse tape travel, if the band arm 40 is in the state of FIG. 2, the feed reel base 4 cannot be driven under the load of the tension band 23. To solve this problem, the mode motor 31 is driven to shift the function mode to No. 7 and thereby obtain the state of FIG. 1, in which the slider 39 slides to the left of the figure and the engaging portion 39a separates from the engaging portion 40a so that the band arm 40 and the slider 39 are disengaged from each other. In this state the band arm 40 is held by the biasing force of the spring 42, thus permitting the intermittent reverse tape travel. More specifically, when the direction of rotation of the capstan motor 18a is reversed to rotate the capstan shaft 18 in the direction of A', the oscillating gear 27 also moves in the direction of arrow A, so that the feed reel base 4 can be driven since the band arm 40 can now be pivoted clockwise by only the load corresponding to the biasing force of the spring 42 so the load of the tension band 23 is reduced.

During the short time required for the movement of the oscillating gear 27 at the time of such forward to reverse change-over, it is impossible to wind up the magnetic tape 3 delivered from the reverse-rotated capstan shaft 18, but since the band arm 40 can pivot clockwise in a predetermined range, an unwindable amount of looseness of the magnetic tape 3 can be absorbed by the tension pole 22 by setting an appropriate tension of the spring 20 and that of the spring 42.

Figure 1:
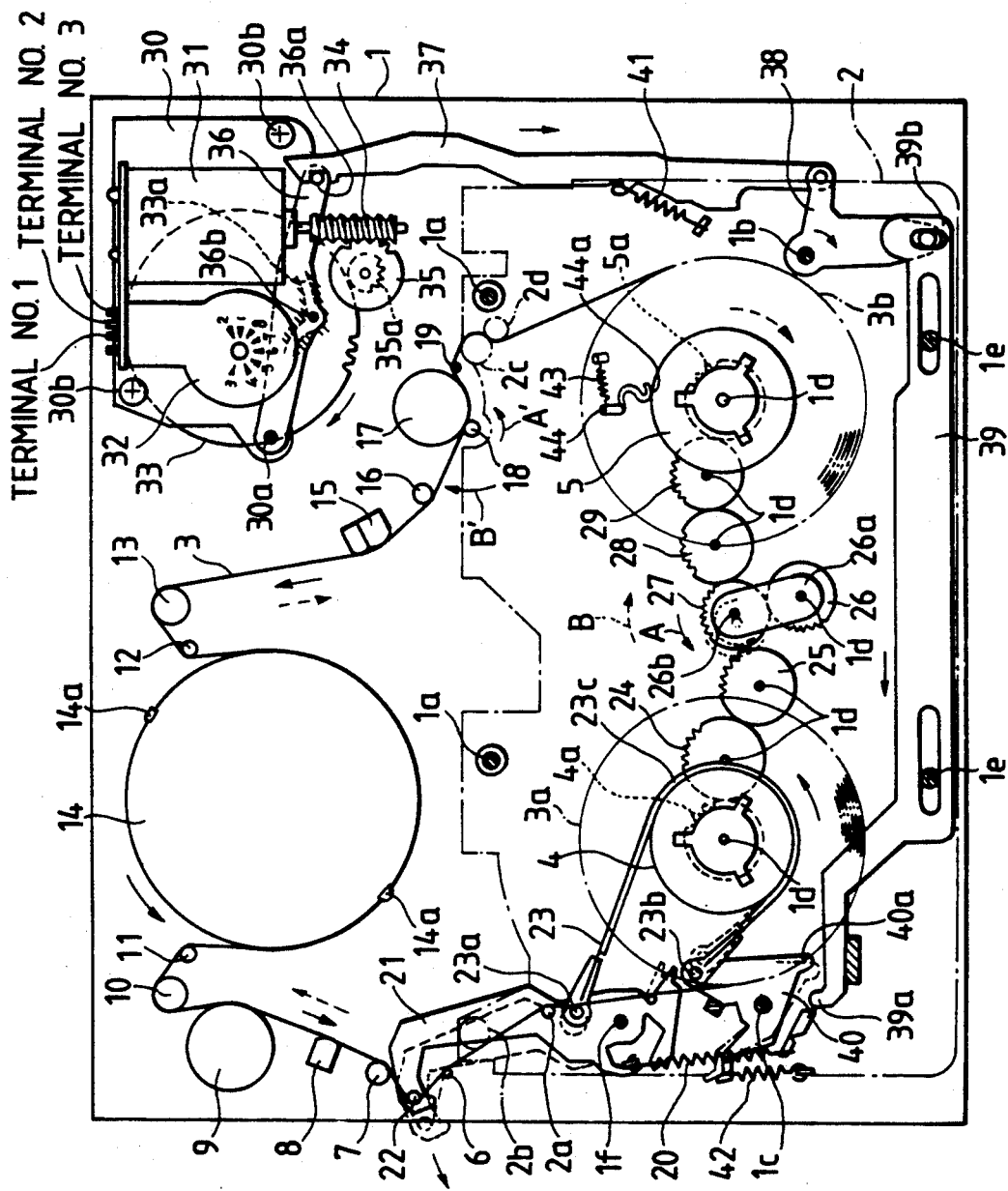
FIG. 1 is a plan view of the entire mechanism of a video tape recorder and/or reproducer (reverse and forward intermittent travel modes) embodying the present invention.

After the shift of the function mode into the state shown in FIG. 1, when change-over is made again from the reverse to the forward intermittent tape feed, that is, no matter how many times the forward-reverse change-over is repeated, this can be done by only the rotating direction change-over control for the capstan motor 18a without a shift in the function mode, that is, in the state of function mode No. 7. More specifically, by setting an appropriate tension of the spring 20 and that of the spring 40 it becomes possible to well balance the tension of the magnetic tape 3. Taking note of this point, the present invention provides a system wherein the change-over of the forward and reverse intermittent tape travels from one to the other can be done by only controlling the changing of the direction rotation of the capstan motor 18a.

By this method the time required for the forward-reverse change-over operation in the so-called slow-motion reproduction, etc. is shortened to a remarkable extent. When the forward, intermittent tape feed has been continued for a long period of time, the function mode may be returned to No. 6, or the function mode 7 may be continued, depending on the characteristics of the apparatus.

According to the present invention, the forward or reverse change-over operation in the slow-motion reproduction can be done instantaneously without using any special motor for reel, and thus the function which has heretofore been provided only in high-grade apparatus can now be provided also in so-called inexpensive apparatus. Further, since the tape travelling direction change-over can be done by only the forward-reverse change-over of the capstan motor, there is no operation of any other component of the apparatus and hence the reliability of the apparatus is improved.

We claim:

1. A video tape recording and/or reproducing apparatus having a normal mode of operation for recording and/or reproducing a video signal on/from a magnetic tape during a continuous travel in a forward direction and a slow-motion mode of operation for reproducing the video signal from the magnetic tape during an intermittent travel in the forward direction or a reverse direction, said apparatus comprising:

two guide means provided on a chassis base of the apparatus for guiding a travel of the magnetic tape;

a tension pole means for imparting a tension to the magnetic tape during travel thereof;

a tension arm rotatable provided on said chassis base, said tension arm having said tension pole means mounted on a first end thereof and positioning said tension pole means at a position between said two guide means and outside a line extending between said two guide means;

a feed reel base for mounting a tape feed reel;

a tension band having a first end rotatably fixed on a portion of said tension arm and including a main portion wound on said feed reel base;

a band arm rotatably provided on said chassis base, said band arm including a portion on which a second end of said tension band is rotatably fixed;

spring means including a first spring and a second spring, said first spring imparting a first force on said tension arm so as to rotate said tension arm so that said main portion of said tension band is tightened around said feed reel base and said second spring for imparting a second force on said band arm so as to rotate said band arm so that said main portion of said tension band is tightened around said feed reel base, said first and second forces respectively imparted by said first spring and said second spring being such that said feed reel base is urged in directions of rotation counter to each other; and a capstan motor for rotatably driving said feed reel base through torque transmission means, wherein, during the slow-motion mode of operation, said feed reel base is selectively driven in accordance with a forward and reverse direction of rotation of said capstan motor so that the magnetic tape is supplied from or taken up onto the tape feed reel under the tension imparted to the magnetic tape by said tension pole means.

2. A video tape recording and/or reproducing apparatus according to claim 1, wherein said apparatus further comprises an engagement member having a first engaging portion and said band arm is provided with a second engaging portion, said engagement member being selectively movable into a first position in which said first engaging portion of said engagement member engages with said second engaging portion of said band arm to prevent said band arm from rotating and a second position in which said first engaging portion of said engagement member separates from said second engaging portion of said band arm to allow said band arm to rotate, and wherein during the normal operation, said engagement member is moved into said first position so that said band arm is not rotated by said second force imparted thereon and the tension imparted to the magnetic tape by said tension pole means is determined on the basis of said first force imparted on said tension arm irrespective of said second force imparted on said band arm.

3. A video tape recording and/or reproducing apparatus according to claim 2, wherein said engagement member includes a slider member.

* * * * *